United States Patent
Shimura

(10) Patent No.: US 8,379,166 B2
(45) Date of Patent: Feb. 19, 2013

(54) PLANAR LIGHT-EMITTING DEVICE AND LIQUID CRYSTAL DISPLAY APPARATUS

(75) Inventor: Takashi Shimura, Yamanashi-ken (JP)

(73) Assignees: Citizen Electronics Co., Ltd., Yamanashi-Ken (JP); Citizen Holdings Co., Ltd., Tokyo (JP)

(*) Notice: Subject to any disclaimer, the term of this patent is extended or adjusted under 35 U.S.C. 154(b) by 352 days.

(21) Appl. No.: 12/792,208

(22) Filed: Jun. 2, 2010

(65) Prior Publication Data

US 2010/0309407 A1   Dec. 9, 2010

(30) Foreign Application Priority Data

Jun. 5, 2009  (JP) ................................. 2009-136718

(51) Int. Cl.
*G02F 1/1335* (2006.01)
(52) U.S. Cl. ............................. 349/65; 349/62; 362/616
(58) Field of Classification Search .................. 349/65, 349/62, 67; 362/615–617, 619, 620, 623, 362/97.2, 339, 606
See application file for complete search history.

(56) References Cited

U.S. PATENT DOCUMENTS

| | | | |
|---|---|---|---|
| 6,241,358 B1 | 6/2001 | Higuchi et al. | |
| 7,220,043 B2* | 5/2007 | Cha et al. | 362/621 |
| 7,413,330 B2* | 8/2008 | Furukawa | 362/600 |
| 7,898,613 B2* | 3/2011 | Jung et al. | 349/62 |
| 8,077,272 B2* | 12/2011 | Shimura et al. | 349/65 |
| 8,113,704 B2* | 2/2012 | Bae et al. | 362/613 |
| 8,218,096 B2* | 7/2012 | Cha et al. | 349/15 |
| 2006/0092662 A1 | 5/2006 | Noh et al. | |
| 2006/0273337 A1 | 12/2006 | Han et al. | |
| 2008/0101082 A1* | 5/2008 | Kitamura et al. | 362/606 |
| 2009/0284956 A1 | 11/2009 | Gomi et al. | |

FOREIGN PATENT DOCUMENTS

| | | |
|---|---|---|
| JP | 11-288611 | 10/1999 |
| JP | 2006-134881 | 5/2006 |
| JP | 2006-310045 | 11/2006 |
| JP | 2006-339650 | 12/2006 |
| JP | 2007-134224 | 5/2007 |
| JP | 2007-149657 | 6/2007 |
| JP | 2007-329114 | 12/2007 |

* cited by examiner

*Primary Examiner* — Thoi Duong
(74) *Attorney, Agent, or Firm* — Wenderoth, Lind & Ponack, L.L.P.

(57) ABSTRACT

A planar light-emitting device having a plurality of light units each including a light source and a lightguide member that guides light received from the light source through an end surface serving as a light-entrance surface disposed to face the light source and that emits the light from an upper surface and two mutually opposing side surfaces after changing the optical path of the light, and further has a reflecting member having a light-reflecting surface on which the light units are disposed. The lightguide member has an elongated shape. The light units are disposed in linear arrays each in which the light units are linearly disposed in series in the elongated direction of the lightguide member. The linear arrays extend in the elongated direction of the respective lightguide members. The linear arrays extend in parallel with each other and are spaced from each other in a width direction perpendicularly intersecting the elongated direction of the lightguide members.

9 Claims, 6 Drawing Sheets

PLANAR LIGHT-EMITTING DEVICE AND LIQUID CRYSTAL DISPLAY APPARATUS

This application claims priority under 35 U.S.C. §119 to Japanese Patent application No. JP2009-136718 filed on Jun. 6, 2009, the entire contents of which are hereby incorporated by reference.

TECHNICAL FIELD

The present invention relates to a planar light-emitting device that illuminates a liquid crystal display panel or the like. The present invention also relates to a liquid crystal display apparatus having such a planar light-emitting device.

BACKGROUND ART

Liquid crystal display apparatuses for image display are widely used as the large-sized displays of flat-screen television systems and monitors, etc. The liquid crystal display apparatuses employ a backlight unit that applies illuminating light to a liquid crystal display panel from the back to enhance the luminance of the display screen.

There have been known the following two different types of backlight units for large-sized liquid crystal television systems. One type is known as a direct light type backlight unit in which a plurality of light sources, e.g. light-emitting diodes (LEDs) or cold-cathode fluorescent lamps (CCFLs), are arranged directly below a liquid crystal display panel as a display screen and directed toward the entire display screen to illuminate the liquid crystal display panel directly with light emitted from the light sources.

The other type is an edge-light type backlight unit in which a plurality of light source, e.g. LEDs or CCFLs, are disposed along a side edge of a lightguide plate having the same size as the display screen, and in which the wave guiding and emission of light are controlled to emit light from the entire main surface of the lightguide plate toward the display screen. It should be noted that a resin-molded product is used as the lightguide plate. There have also been proposed other types of backlight units. In one type, light sources are disposed under a lightguide plate to introduce light from the light sources into the lightguide plate to guide and emit the light from the entire main surface of the lightguide plate toward the display screen. In another type, a plurality of lightguide plates are arranged adjacent to each other to form an integrated light-exiting surface of the same size as the display screen (see Japanese Patent Application Publication Nos. 2006-134881, 2006-339650, 2007-134224, 2007-149657, 2007-329114, 2006-310045, and Hei 11-288611).

Recently, as liquid crystal television systems increase in size, the demand for reduction in weight and thickness of the television systems has been becoming stronger. In this regard, the conventional direct light type backlight unit has the following problem. Because a plurality of light source are disposed directly below the display screen, there are large differences in brightness on the display screen between spots directly below which light sources are present and spots having no light sources located directly below. Therefore, it is necessary in order to illuminate the entire display screen with uniform brightness without luminance unevenness to set a wide space between the display screen and the light sources. Consequently, the direct light type backlight unit suffers from an increased overall thickness.

With the conventional edge-light type backlight unit or the like that illuminates the display screen through a lightguide plate, it is necessary to ensure a lightguide surface of the same size as the display screen by disposing a large-sized lightguide plate of the same size as the display screen or laying a plurality of lightguide plates close to each other without any gap between adjacent lightguide plates. Therefore, the edge-light type backlight unit has the disadvantage that the lightguide plate weight increases. If injection molding is employed as a method of producing a large-sized lightguide plate, it is difficult to fill the resin material throughout the molding tool when producing a large-area and thin lightguide plate. This problem can be solved by using a large-sized molding machine and increasing the injection pressure to fill the resin material satisfactorily. This solution, however, is difficult to adopt because the use of a large-sized molding machine causes an increase in cost of equipment. In addition, it is difficult with the edge-light type backlight unit to locally illuminate the display screen by local dimming, for example, and hence difficult to reduce the power consumption. It is also necessary to take thermal measures because a plurality of light sources such as LEDs are densely disposed along an end edge of the lightguide plate.

SUMMARY OF THE INVENTION

The present invention has been made in view of the above-described problems. Accordingly, an object of the present invention is to provide a planar light-emitting device capable of achieving reductions in weight and thickness and another object of obtaining high luminance uniformity and favorable appearance as a whole. A further object of the present invention is to provide a liquid crystal display apparatus using the planar light-emitting device of the present invention.

The present invention provides a planar light-emitting device having a plurality of light units each including a light source having a light-exiting surface and a lightguide member having an elongated shape. The lightguide member has an upper surface, a lower surface, and a peripheral side surface extending between the upper surface and the lower surface. The peripheral side surface has an end surface serving as a light-entrance surface disposed to face the light-exiting surface of the light source, an end surface opposed to the light-entrance surface, and two side surfaces extending between the light-entrance surface and the end surface opposed to the light-entrance surface. The lightguide member guides light received from the light-exiting surface of the light source through the light-entrance surface toward the end surface opposed to the light-entrance surface and emits the light from the upper surface and the side surfaces while guiding the light. The planar light-emitting device further has a reflecting member having a light-reflecting surface disposed to contact the lower surfaces of the light units. The plurality of light units are disposed in linear arrays each in which the light units are linearly disposed in series in an elongated direction of the lightguide members. The linear arrays extend in the elongated direction of the respective lightguide members, the linear arrays extend in parallel with each other and are spaced from each other in a width direction perpendicularly intersecting the elongated direction of the lightguide members.

The light-reflecting surface may be quadrilateral in shape, and one of the linear arrays may be arranged along one diagonal line of the light-reflecting surface.

The lightguide member may have chamfers between the upper surface and the two side surfaces. The upper surface of the lightguide member may be provided with a plurality of mutually parallel prisms extending in the elongated direction of the lightguide member.

The light-entrance surface of the lightguide member may have an overhang portion projecting to a position directly above the light-exiting surface of the light source disposed to face the light-entrance surface. The overhang portion may be provided at an upper surface of the overhang with a light-shielding part that absorbs light emitted upward from the light source.

The linear arrays extend parallel with each other, and in the linear arrays of each pair that are disposed adjacent to each other in the width direction, the light-entrance surfaces of the lightguide members of the light units in one linear array of the pair may be oriented in a direction different from that of the light-entrance surfaces of the lightguide members of the light units in an other linear array of the pair.

The plurality of linear arrays extend parallel with each other and are spaced from each other in the width direction may be disposed at respective positions displaced from each other in the elongated direction of the lightguide member to displace the positions of the light sources of the light units in one linear array of each pair of linear arrays adjacent to each other in the width direction relative to the positions of the light sources of the light units in the other linear array of the pair in the elongated direction of the lightguide member.

The bottom of the lightguide member may be provided with projecting hooks capable of fitting into mounting holes formed in the reflecting member.

In addition, the present invention provides a liquid crystal display apparatus including a liquid crystal display panel and the above-described planar light-emitting, which is disposed at the back of the liquid crystal display panel.

According to the planar light-emitting device of the present invention, a plurality of light units including lightguide members, respectively, are arrayed in a plurality of rows, with the lightguide members being adjacent to each other in the elongated direction of the lightguide members in each row, and these rows are spaced from each other. Therefore, it is possible to achieve reductions in weight and thickness and to obtain high luminance uniformity and favorable appearance as a whole. It is also possible to perform local lighting control such as local dimming for each light unit and hence possible to reduce the power consumption. Further, the light sources are not densely located and therefore it is unnecessary to take special thermal measures. Further, it is possible to realize a large-sized planar light-emitting device having excellent luminance uniformity and favorable appearance as a whole by installing a plurality of light units including small-sized lightguide members that need neither a large-sized molding machine nor mold machining and that can be manufactured easily and at low cost. In addition, the liquid crystal display apparatus having the planar light-emitting device is lightweight and thin and yet capable of displaying an image of large area and of favorable appearance owing to high luminance uniformity.

The present invention will be explained below by way of embodiments shown in the accompanying drawings. It should be noted that the scale of each figure used in the following explanation is properly changed for the sake of easy understanding.

DETAILED DESCRIPTION OF THE INVENTION

Figure 1:
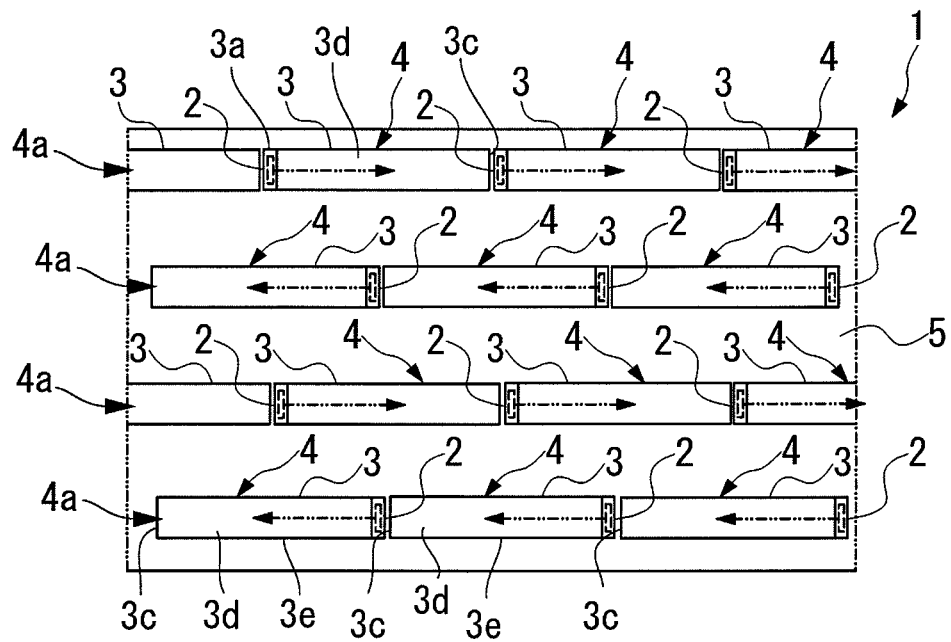
FIG. 1 is a plan view of a planar light-emitting device according to a first embodiment of the present invention.
Figure 2:
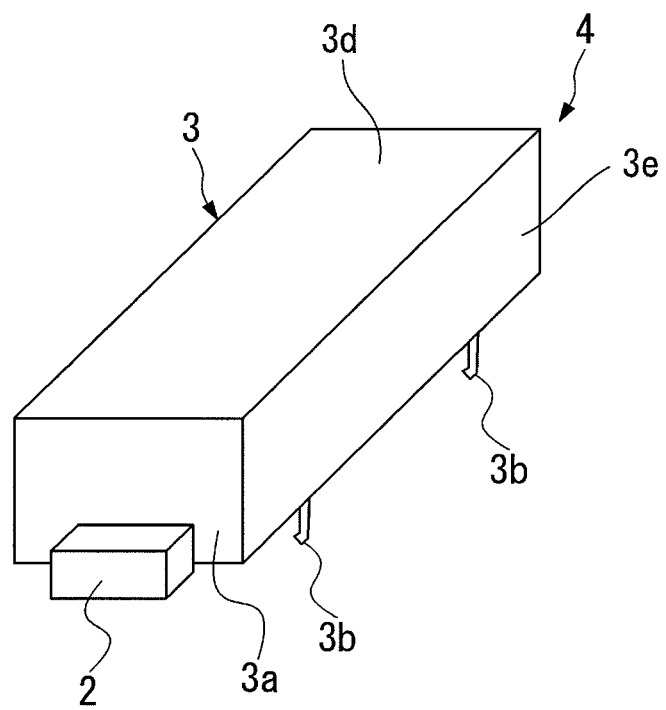
FIG. 2 is a perspective view of a light unit used in the planar light-emitting device shown in FIG. 1.

A planar light-emitting device 1 according to a first embodiment of the present invention has, as shown in FIGS. 1 and 2, a plurality of light units 4 and a reflecting member 5 having a light-reflecting surface disposed to contact the lower surfaces of the light units 4. Each light unit 4 includes a light source 2 having a light-exiting surface and a lightguide member 3 that has an elongated shape and that has an upper surface 3*d*, a lower surface, and a peripheral side surface extending between the upper and lower surfaces. The peripheral side surface has an end surface 3*a* serving as a light-entrance surface disposed to face the light-exiting surface of the light source 2, an end surface 3*c* opposed to the light-entrance surface, and two mutually opposing side surfaces 3*e* extending between the light-entrance surface 3*a* and the end surface 3*c* opposed to the light-entrance surface 3*a*. The lightguide member 3 guides light received from the light-exiting surface of the light source 2 through the light-entrance surface 3*a* toward the end surface 3*c* opposed to the light-entrance surface 3*a*, and while doing so, the lightguide member 3 emits the light from the upper surface 3*d* and the two mutually opposing side surfaces 3*e*.

The plurality of light units 4 are disposed in linear arrays 4*a* each in which the light units are linearly disposed in series in the elongated direction of the lightguide member 3. The linear arrays 4*a* extend in the elongated direction of the respective lightguide members 3, the linear arrays 4*a* extend in parallel with each other and are spaced from each other in a width direction perpendicularly intersecting the elongated direction of the lightguide member 3.

The reflecting member 5 is a quadrilateral reflecting sheet or reflecting plate whose upper surface is a light-reflecting surface. The reflecting member 5 may be a metal plate, film, foil or the like having a light-reflecting function. In this embodiment, a film provided with an evaporated silver layer is used as the reflecting member 5. It should be noted that a film provided with an evaporated aluminum layer or the like may be used in place of the film provided with an evaporated silver layer. This embodiment uses as the reflecting member 5 a reflecting sheet bonded to a surface of a printed circuit board (PCB) 6 by using double-coated adhesive tape (not shown). The reflecting member 5 may be a white reflecting sheet. It should be noted that the shape of the light-reflecting surface of the reflecting member 5 may be determined to realize an aspect ratio of 16:9, which is the mainstream aspect ratio of large-sized backlight units, for example.

In the planar light-emitting device 1, the linear arrays 4a are provided parallel to the long sides of the light-reflecting surface. In the planar light-emitting device 1, the light units 4 arranged in each linear array 4a are oriented in the same direction, but the linear arrays 4a in each pair of mutually adjacent linear arrays 4a are oriented opposite to each other. That is, the light-entrance surfaces of the lightguide members 3 in each pair of mutually adjacent linear arrays 4a are directed opposite to each other to realize a configuration in which, in the first and third rows from the top in FIG. 1, the exiting direction of light from the light sources 2 is rightward as shown by the arrows, and in the second and fourth rows from the top, the light exiting direction is leftward.

In the embodiment shown in FIG. 1, the light units 4 arranged in one linear array 4a and those in an adjacent linear array 4a are disposed parallel to and displaced from each other by substantially half of the length of one light unit 4.

The lightguide member 3 is made of a transparent resin, e.g. a polycarbonate or acrylic resin. The end surface 3a of the lightguide member 3, which serves as a light-entrance surface, may be provided with a plurality of prism surfaces having a V-shaped sectional configuration, for example. The upper surface 3d and the two mutually opposing side surfaces 3e of the lightguide member 3, which serve as light-exiting surfaces, may be provided with microscopic optical configurations, e.g. white dot patterns or prism configurations, to adjust the light exiting direction and luminance.

The bottom of the lightguide member 3 included in each of the light units 4 has, as shown in FIG. 2, projecting hooks 3b capable of fitting into mounting holes (not shown) formed in the reflecting member 5. The projecting hooks 3b are fitted into the mounting holes of the reflecting member 5 and those of the PCB 6 to secure the lightguide member 3.

The light sources 2 are LED light sources mounted on a flexible printed circuit board (not shown) installed on the light-reflecting surface of the reflecting member 5. The LED light source used as each light source 2 is, for example, a white LED installed with the front end surface as a light-exiting surface opposed to the end surface 3a as a light-entrance surface. The white LED is, for example, a semiconductor light-emitting element mounted on a substrate and sealed with a sealing resin. The semiconductor light-demitting element is, for example, a blue (wavelength λ: 470 to 490 nm) LED element or an ultraviolet (wavelength λ: less than 470 nm) LED element, which is formed by stacking a plurality of layers of a gallium nitride compound semiconductor (e.g. InGaN compound semiconductor) on an insulating substrate, e.g. a sapphire substrate.

The sealing material used to seal the semiconductor light-emitting element contains a silicone resin as a main component and has, for example, a YAG fluorescent substance added to the silicone resin. The YAG fluorescent substance converts blue or ultraviolet light from the semiconductor light-emitting element into yellow light, and white light is produced by color mixing effect. It should be noted that the LED light source has a reflecting frame formed over the side surfaces of the resin material except the front end surface and the mounting surface attached to the board to emit light only from the front end surface, which serves as a light-exiting surface. Further, it is possible to use various white LEDs besides those described above.

Figure 3:
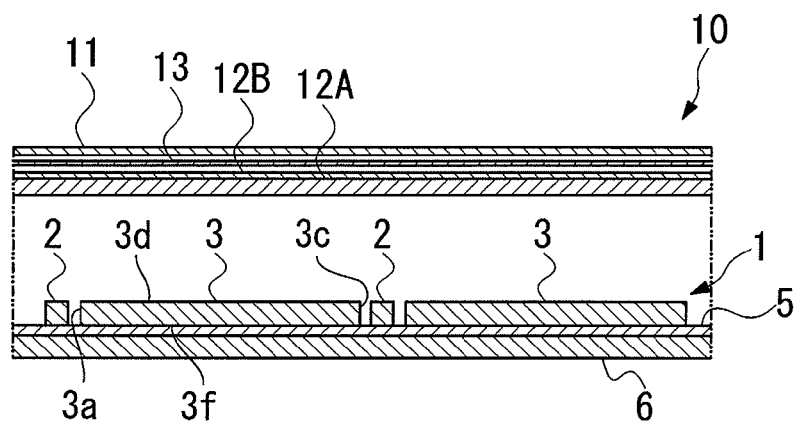
FIG. 3 is a schematic sectional view of a liquid crystal display apparatus using the planar light-emitting device shown in FIG. 1.

A liquid crystal display apparatus 10 according to this embodiment is a display apparatus applicable to a liquid crystal display of a large-sized liquid crystal television system, for example, and has, as shown in FIG. 3, a liquid crystal display panel 11 and the above-described planar light-emitting device 1 disposed at the back of the liquid crystal display panel 11.

The liquid crystal display apparatus 10 includes the above-described planar light-emitting device 1 comprising a plurality of light units 4 and a reflecting member 5, a diffusing plate 12A that diffuses light from the light units 4 to make uniform the intensity of light applied to the liquid crystal display panel 11, a diffusing sheet 12B disposed over the diffusing plate 12A, a prism sheet 13 disposed over the diffusing sheet 12B to emit light from the diffusing sheet 12B as upward illuminating light toward the liquid crystal display panel 11, and the liquid crystal display panel 11 disposed over the prism sheet 13. It should be noted that, in this embodiment, the display screen side of the liquid crystal display panel 11 and the light-exiting surface side of the planar light-emitting device 1 are referred to as the "front side" or "upper side".

The diffusing plate 12A and the diffusing sheet 12B are a plate and a sheet, respectively, made of a transparent resin, e.g. an acrylic or polycarbonate resin, having silica particles or the like dispersed in the resin. The prism sheet 13 is a transparent sheet-shaped member for collecting light from the diffusing sheet 12B to the upper side and has on the upper side a plurality of prisms having mutually parallel ridges. The prisms of the prism sheet 13 are disposed with the ridges extending parallel to the upper and lower edges of the light-entrance surfaces of the lightguide members 3 and oriented to extend intersecting the optical axes of the light sources 2 in plan view, i.e. as viewed from the upper side. To obtain high directivity in the upward direction, in particular, the prisms of the prism sheet 13 are oriented to perpendicularly intersect the optical axes of the light sources 2.

The liquid crystal display panel 11 is a transmissive or semitransmissive liquid crystal display panel. In the case of a transmissive type, for example, the liquid crystal display panel 11 has a TFT, STN, TN or other liquid crystal panel body having a liquid crystal material sealed with a sealant in a gap between an upper substrate and a lower substrate, each having a stack of a transparent electrode layer, an alignment film and a polarizer.

In the planar light-emitting device 1 according to this embodiment, a plurality of light units 4 are disposed as a plurality of mutually spaced rows, i.e. a plurality of mutually spaced linear arrays 4a, and configured to emit light from the upper surface 3d and two mutually opposing side surfaces 3e of each light unit 4 to form one integrated planar light source as a whole. Therefore, it is possible to obtain exiting light of relatively uniform luminance by using a reduced number of lightguide plates and to realize a thin and lightweight planar light-emitting device.

It is also possible to perform local lighting control such as local dimming for each light unit 4 and hence possible to reduce the power consumption. Further, because the mutually adjacent linear arrays 4a are spaced from each other, the light sources 2 are not densely located. Therefore, it is unnecessary to take special thermal measures. Further, the light units 4 in each pair of mutually adjacent linear arrays 4a are displaced from each other in the elongated direction. Accordingly, each light source 2 in one linear array 4a is adjacent to a lightguide plate in a linear array 4a adjacent to the one linear array 4a, and it is therefore possible to prevent the spots corresponding to the light sources 2 from becoming dark when the planar light-emitting device is seen from the upper side.

In addition, because the light units 4 in each pair of mutually adjacent linear arrays 4a are oriented opposite to each other, the light orientation direction is reversed for each of the adjacent linear arrays 4a. Accordingly, the pattern of highs and lows in the luminance distribution differs between each pair of mutually adjacent linear arrays 4a. Consequently, the luminances on the light-exiting surface of the planar light-emitting device are equalized to obtain higher luminance uniformity and even more favorable appearance as a whole.

Accordingly, the liquid crystal display apparatus 10 using the planar light-emitting device 1 as a backlight unit can be reduced in weight and thickness, and it is possible to display a large-area image with high luminance uniformity and favorable appearance.

Next, second to fifth embodiments of the present invention will be explained below with reference to FIGS. 4 to 9. In the following explanation of each embodiment, the same constituent elements as those in the foregoing first embodiment are denoted by the same reference numerals as used in the first embodiment, and a detailed description of the same constituent elements is omitted.

Figure 4:
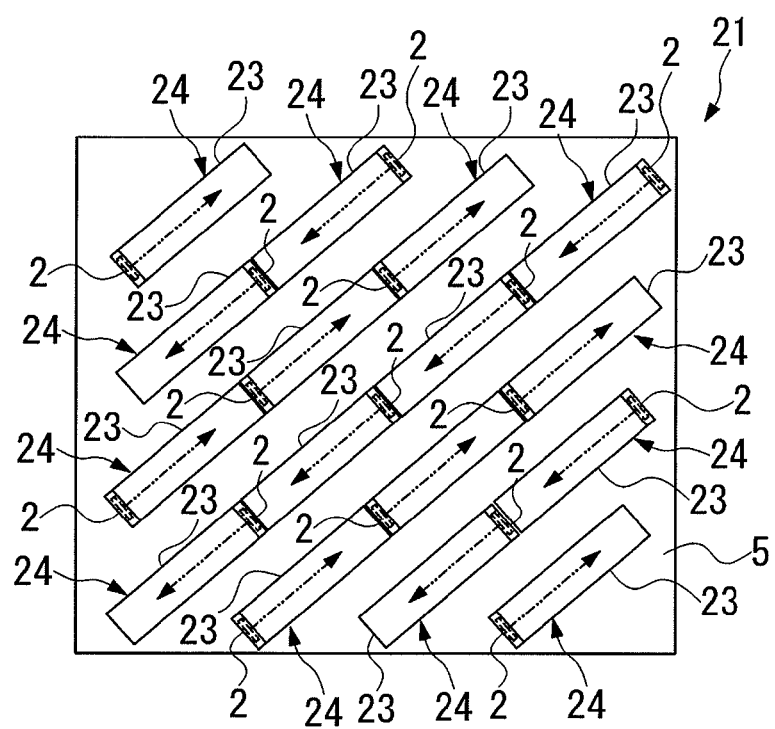
FIG. 4 is a plan view of a planar light-emitting device according to a second embodiment of the present invention.
Figure 5:
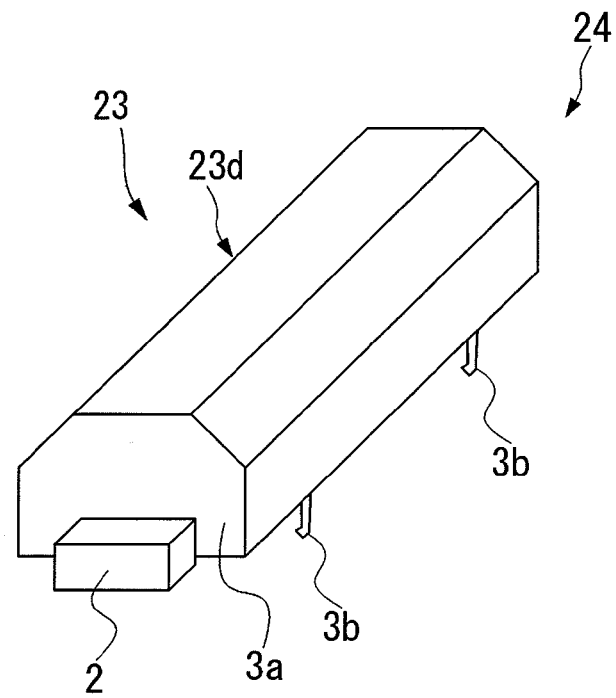
FIG. 5 is a perspective view of a light unit used in the planar light-emitting device shown in FIG. 4.

FIG. 4 shows a planar light-emitting device 21 according to a second embodiment of the present invention, in which light units 24 are arrayed parallel to one diagonal line of the reflecting member 5. One of the linear arrays is arranged along the one diagonal line of the light-reflecting surface. This arrangement can increase the layout efficiency of lightguide members 23 and improve the luminance uniformity as compared to the planar light-emitting device 1 according to the first embodiment. The lightguide member 23 constituting each light unit 24 has, as shown in FIG. 5, an upper surface 23d chamfered at both side edges to form inclined surfaces. Thus, the upper part of the cross-section of the lightguide member 23 has a trapezoidal shape. With the upper surface 23d comprising a top surface and inclined surfaces at both sides of the top surface, it is possible to eliminate high-luminance regions that are likely to occur at the side edges of the upper surfaces 3d of the lightguide members 3 in the first embodiment, and hence possible to improve the appearance. It is also possible to adjust the directivity of light exiting from the lightguide member 23 by changing the chamfer angle of the upper surface 23d.

Figure 6:
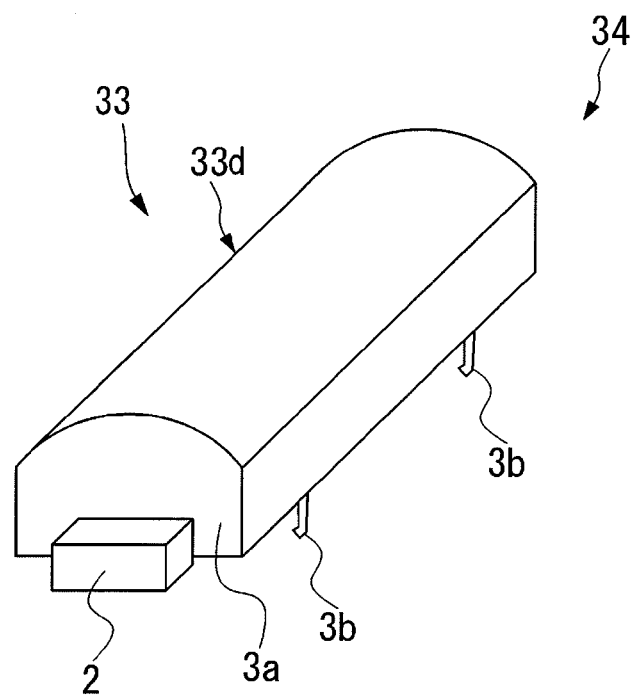
FIG. 6 is a perspective view of a light unit according to a third embodiment of the present invention.

FIG. 6 shows a light unit 34 according to a third embodiment of the present invention, in which the upper surface 33d of a lightguide member 33 constituting the light unit 34 has an arcuate sectional configuration. Accordingly, it is possible to eliminate high-luminance regions that are likely to occur at the side edges of the upper surfaces 3d of the lightguide members 3 in the first embodiment, and hence possible to improve the appearance, as in the case of the second embodiment. It is also possible to adjust the directivity of light exiting from the lightguide member 33 by changing the curvature of the upper surface 33d of the lightguide member 33.

Figure 7:
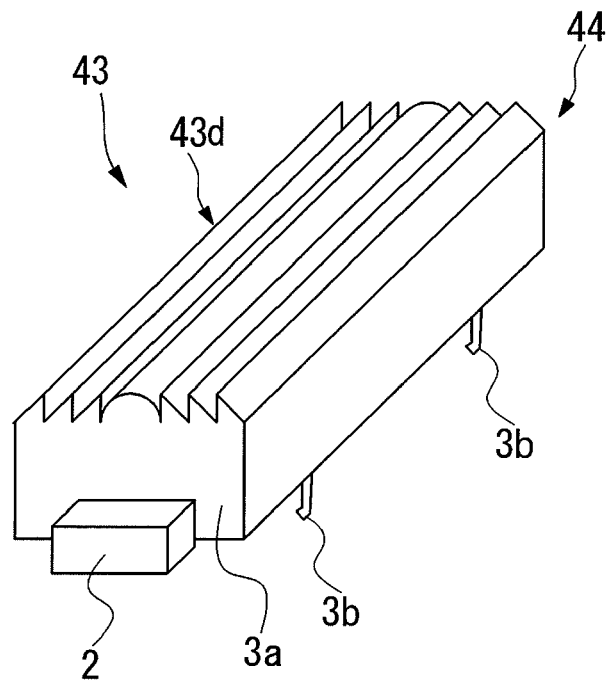
FIG. 7 is a perspective view of a light unit according to a fourth embodiment of the present invention.

FIG. 7 shows a light unit 44 according to a fourth embodiment of the present invention, in which the upper surface 43d of a lightguide member 43 constituting the light unit 44 has a plurality of mutually parallel prism-shaped portions extending in the elongated direction of the lightguide member 43.

Figure 8:
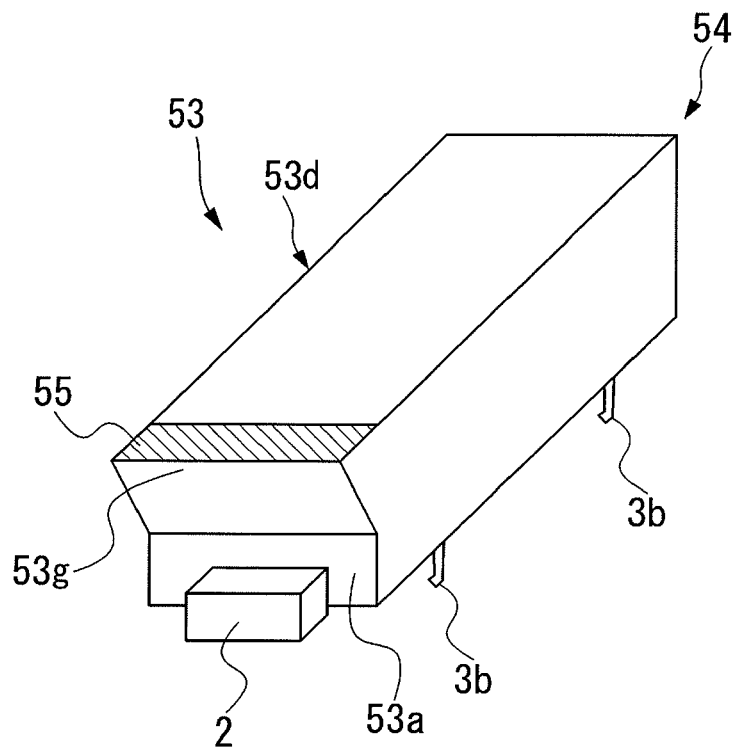
FIG. 8 is a perspective view of a light unit according to a fifth embodiment of the present invention.
Figure 9:
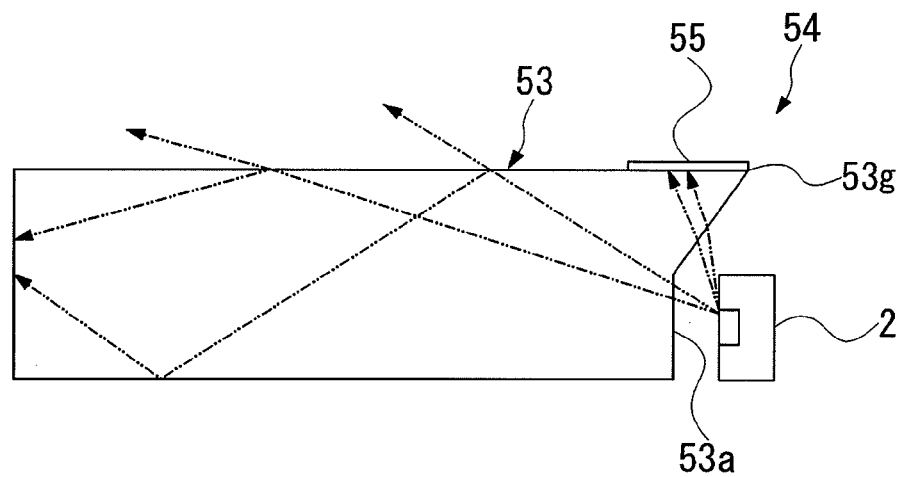
FIG. 9 is a sectional view of the light unit shown in FIG. 8.

FIGS. 8 and 9 show a light unit 54 according to a fifth embodiment of the present invention, in which a lightguide member 53 constituting the light unit 54 has an overhang portion 53g formed on the upper part of an end surface 53a serving as a light-entrance surface of the lightguide member 53. The overhang portion 53g projects to cover the upper part of the light source 2. The upper surface of the overhang portion 53g is provided with a light-shielding part 55 having a light-absorbing function to absorb light emitted upward from the light source 2 or a light-reflecting function to reflect light emitted upward from the light source 2 back into the lightguide member 53. The light-shielding part 55 may be formed, for example, by bonding a black sheet, metal plate, film, foil or the like having a light-absorbing function to the upper surface of the overhang portion 53g. The light-shielding part 55 may also be formed by vapor deposition of silver, for example.

The lightguide member 53 can suppress the generation of a hot spot when there is a certain gap between the light source 2 and the end surface 53a as a light-entrance surface of the lightguide member 53 due to mounting misalignment of the light source 2 and this gap undesirably allows light to leak obliquely upward of the light source 2.

Figure 10:
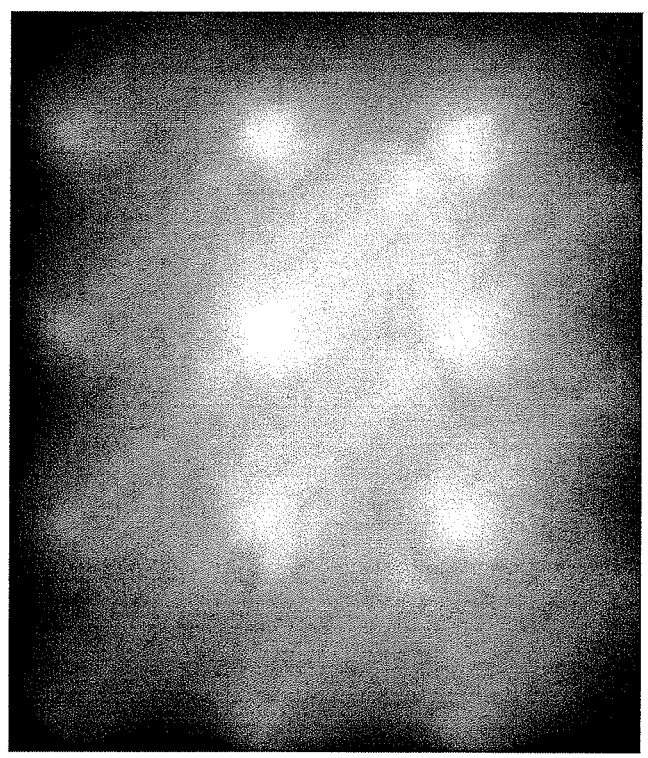
FIG. 10 is an image showing the luminance distribution on the light-exiting surface of the planar light-emitting device according to the second embodiment using lightguide members having flat upper surfaces as shown in FIG. 2.
Figure 11:
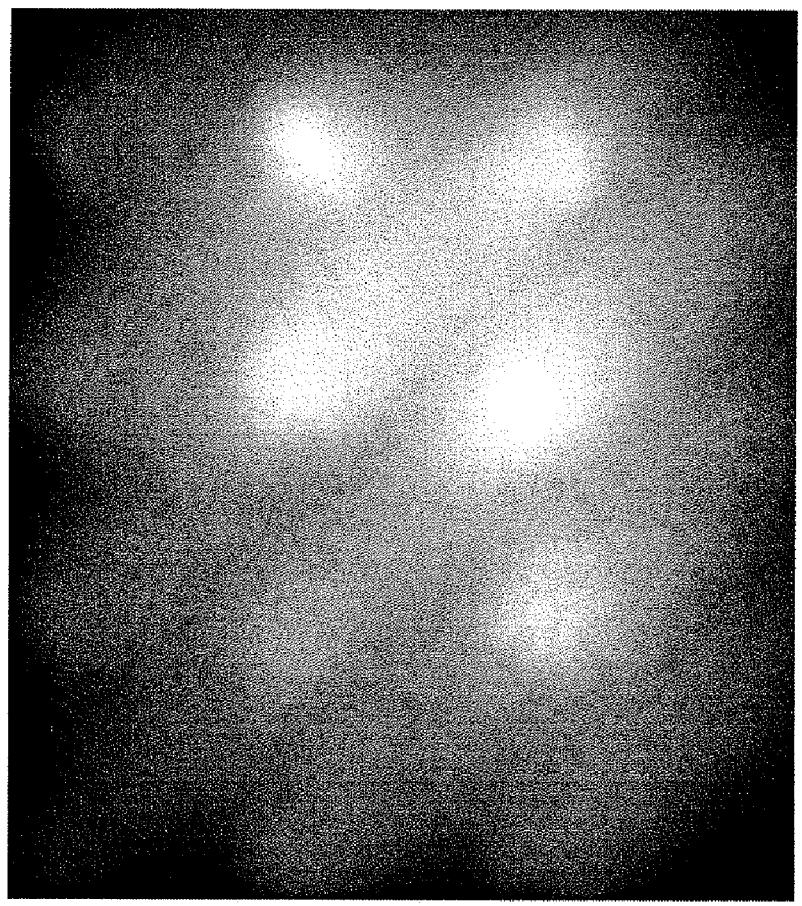
FIG. 11 is an image showing the luminance distribution on the light-exiting surface of the planar light-emitting device according to the second embodiment using lightguide members having upper surfaces chamfered at side edges as shown in FIG. 5.

We prepared two different planar light-emitting devices. That is, a group of lightguide members 3 according to the first embodiment having flat upper surfaces and a group of lightguide members 23 according to the second embodiment, the upper parts of which had a trapezoidal cross-sectional configuration, were each arrayed parallel to one diagonal line of a reflecting member 5 to form a planar light-emitting device as shown in FIG. 4, and the luminance distribution on the light-exiting surface of each planar light-emitting device was examined. As a result, it was revealed that, with the planar light-emitting device using the lightguide members 3 according to the first embodiment having flat upper surfaces, the opposite side edges of the upper surfaces of the lightguide members are conspicuously bright, as shown in FIG. 10, whereas the planar light-emitting device using the lightguide members 23 according to the second embodiment, the upper parts of which have a trapezoidal cross-sectional configuration, provides an even more uniform luminance distribution and improved appearance, as shown in FIG. 11.

It should be noted that the present invention is not limited to the foregoing embodiments but can be modified in a variety of ways without departing from the scope of the present invention.

For example, the linear arrays 4a may be arranged to extend in the long-side or short-side direction of the planar light-emitting device. The linear arrays 4a need not necessarily be equally spaced, but the spacing between the linear arrays 4a may be properly varied to make more uniform the luminance distribution on the light-exiting surface of the planar light-emitting device.

Although in the first and second embodiments all the lightguide members have the same length, it is also possible to install lightguide members of different lengths in different areas of the planar light-emitting device. For example, the arrangement may be as follows. When a plurality of linear arrays 4a extending in the short-side direction of the planar light-emitting device are spaced from each other in the long-side direction, areas near the short sides of the planar light-emitting device are provided with lightguide members shorter in length than those installed in the central area to increase the number of light units installed in the areas near the short sides to make the luminance at the central area similar to those at the neighborhoods of the short sides. When a plurality of linear arrays 4a extending in the long-side direction of the planar light-emitting device are spaced from each other in the short-side direction, areas near the long sides of the planar light-emitting device are provided with lightguide members shorter in length than those installed in the central area to increase the number of light units installed in the areas near the long sides to make the luminance at the central area similar to those at the neighborhoods of the long sides Although in the foregoing embodiments each light source and the associated lightguide member are mounted as discrete members on the light-reflecting surface of the reflecting member, the light source and the lightguide member may be assembled on the light-reflecting surface of the reflecting member in the form of an integrated structure as a light unit.

As the light sources, it is possible to use not only LED light sources of white LEDs but also RGB-LEDs to emit light of all colors. For example, it is possible to use an RGB-LED comprising a combination of a red LED element (R), a green LED element (G) and a blue LED element (B) mounted in one package. Alternatively, LED light sources emitting mutually different colors of light may be disposed for each lightguide member. In these cases, it is possible to illuminate the liquid crystal display panel or the like with various colors of light over the whole planar light-emitting device or for each light unit by controlling the applied electric current for each LED. Although LED light sources are used as light sources in the foregoing embodiments, fluorescent lamps or other types of light sources may also be used.

Although one diffusing plate and one diffusing sheet are used in the liquid crystal display apparatus shown in FIG. 3, either of the diffusing plate and the diffusing sheet may be omitted, or at least either of the diffusing plate and the diffusing sheet may comprise a plurality of diffusing plates or a plurality of diffusing sheets. It is also possible to dispose a diffusing plate or sheet between the prism sheet and the liquid crystal display panel. In other words, the installation position and the number of diffusing plates or sheets are properly set by taking into account haze to correct luminance unevenness.

Although one prism sheet is used in the foregoing embodiments, the liquid crystal display apparatus may use two prism sheets. Although the embodiment shown in FIG. 3 employs a diffusing plate, a diffusing sheet and a prism sheet, each having a size corresponding to that of the liquid crystal display panel, these members may each comprise a plurality of split segments, which are arranged side by side.

The invention claimed is:

1. A planar light-emitting device comprising:
a plurality of light units each including a light source having a light-exiting surface and a lightguide member having an elongated shape, the lightguide member having an upper surface, a lower surface, and a peripheral side surface extending between the upper surface and the lower surface, the peripheral side surface having an end surface serving as a light-entrance surface disposed to face the light-exiting surface of the light source, an end surface opposed to the light-entrance surface, and two side surfaces extending between the light-entrance surface and the end surface opposed to the light-entrance surface, the lightguide member guiding light received from the light-exiting surface of the light source through the light-entrance surface toward the end surface opposed to the light-entrance surface and emitting the light from the upper surface and the side surfaces while guiding the light; and
a reflecting member having a light-reflecting surface disposed to contact the lower surfaces of the light units;
the plurality of light units being disposed in linear arrays each in which the light units are linearly disposed in series in an elongated direction of the lightguide member, the linear arrays extending in the elongated direction of the respective lightguide members, the linear arrays extending in parallel with each other and being spaced from each other in a width direction perpendicularly intersecting the elongated direction of the lightguide members,
wherein, the light-reflecting surface is quadrilateral in shape, one of the linear arrays being arranged along one diagonal line of the light-reflecting surface.

2. The planar light-emitting device of claim 1, wherein the lightguide member has chamfers between the upper surface and the two side surfaces.

3. The planar light-emitting device of claim 1, wherein the upper surface of the lightguide member has a plurality of mutually parallel prisms extending in the elongated direction of the lightguide member.

4. The planar light-emitting device of claim 1, wherein the light-entrance surface of the lightguide member has an overhang portion projecting to a position directly above the light-exiting surface of the light source disposed to face the light-entrance surface, an upper surface of the overhang portion being provided with a light-shielding part that absorbs light emitted upward from the light source.

5. The planar light-emitting device of claim 1, wherein the light-entrance surface of the lightguide member has an overhang portion projecting to a position directly above the light-exiting surface of the light source disposed to face the light-entrance surface, an upper surface of the overhang portion being provided with a light-shielding part that reflects light emitted upward from the light source back into the lightguide member.

6. The planar light-emitting device of claim 1, wherein the linear arrays extend parallel with each other, and in the linear arrays of each pair that are disposed adjacent to each other in the width direction, the light-entrance surfaces of the lightguide members of the light units in one linear array of the pair are oriented in a direction different from that of the light-entrance surfaces of the lightguide members of the light units in an other linear array of the pair.

7. The planar light-emitting device of claim 1, wherein the plurality of linear arrays extending parallel with each other in the elongated direction of the elongated lightguide member and being spaced from each other in the width direction are disposed at respective positions displaced from each other in the elongated direction of the lightguide members to displace positions of the light sources of the light units in one linear array of each pair of the linear arrays adjacent to each other in the width direction relative to positions of the light sources of the light units in an other linear array of the pair in the elongated direction of the lightguide member.

8. The planar light-emitting device of claim 1, wherein a bottom of the lightguide member included in each of the light units has projecting hooks capable of fitting into mounting holes formed in the reflecting member.

9. A liquid crystal display apparatus comprising:
a liquid crystal display panel; and
the planar light-emitting device of claim 1, which is disposed at a back of the liquid crystal display panel.

* * * * *